(12) United States Patent
Chihaia et al.

(10) Patent No.: US 11,914,655 B2
(45) Date of Patent: Feb. 27, 2024

(54) MUTATION-RESPONSIVE DOCUMENTATION GENERATION BASED ON KNOWLEDGE BASE

(71) Applicant: CrowdStrike, Inc., Sunnyvale, CA (US)

(72) Inventors: Theo Chihaia, Bucharest (RO); Horea Razvan Coroiu, Cluj-Napoca (RO); Constantin-Cosmin Crecana, Nicolae Balcescu (RO); Cezar Mihai Socoteanu, Bucharest (RO); Alexandru Postica, Bucharest (RO)

(73) Assignee: CROWDSTRIKE, INC., Sunnyvale, CA (US)

( * ) Notice: Subject to any disclaimer, the term of this patent is extended or adjusted under 35 U.S.C. 154(b) by 81 days.

(21) Appl. No.: 17/589,772

(22) Filed: Jan. 31, 2022

(65) Prior Publication Data

US 2023/0244723 A1 Aug. 3, 2023

(51) Int. Cl.
G06F 7/02 (2006.01)
G06F 16/00 (2019.01)
G06F 16/93 (2019.01)

(52) U.S. Cl.
CPC .................................. *G06F 16/93* (2019.01)

(58) Field of Classification Search
CPC ...................................................... G06F 16/93
See application file for complete search history.

(56) References Cited

U.S. PATENT DOCUMENTS

| | | | |
|---|---|---|---|
| 9,100,202 B2* | 8/2015 | Han | G06F 9/546 |
| 2019/0146970 A1* | 5/2019 | Chamieh | G06F 16/24542 |
| | | | 707/718 |
| 2020/0092084 A1* | 3/2020 | Maroney | H04L 9/3239 |
| 2022/0287078 A1* | 9/2022 | Reddy | H04W 36/0055 |

* cited by examiner

Primary Examiner — Bruce M Moser
(74) Attorney, Agent, or Firm — Lee & Hayes P.C.

(57) ABSTRACT

A documentation generation engine coupled to a mutation handler are provided, configured to traverse a knowledge base to derive selective views. Organizations may configure a documentation generator application running on generator hosts to summarize records of a knowledge base storing institutional knowledge, and relationships therebetween, as human-readable reference documents. It is undesired for the documentation generator to query the knowledge base on a naive basis in response to updates in order to derive views required to generate updated documentation. Therefore, example embodiments of the present disclosure provide a query-writing framework which describes a schema organizing these records for human readability and describing relationships of these records to other records of interest, from which a set of queries may be derived which cause a knowledge base to return all records topically related by a schema of a query-writing framework, while minimizing excess querying unnecessarily amplifying computational workload and network traffic.

20 Claims, 6 Drawing Sheets

MUTATION-RESPONSIVE DOCUMENTATION GENERATION BASED ON KNOWLEDGE BASE

BACKGROUND

Organizations in many industries highly value and prioritize storing their institutional knowledge in structured databases that may be read by computers, as well as by humans, to derive actionable insights, solve internal and customer problems, and refresh organizational know-how. As institutional knowledge becomes more granular, multi-dimensional, and faceted, however, so do the knowledge schemas that are used to encode and store institutional knowledge, and human readability also suffers due to the growing complexity of knowledge schemas.

Today, institutional knowledge derived from relationships between concepts, particularly relationships which can be represented by directions, labels, and the like, may be stored in graph databases. Unlike conventional relational databases, graph databases enable various intuitive visualization and query techniques, as well as powerful analytical computing and data mining techniques. At the same time, graph databases often grow to expansive and relationally dense scopes, and it is often unintuitive to summarize graph databases in a concise, human-readable manner.

Organizations may wish to communicate institutional knowledge by translating it from a form more readable by computers, such as a graph database, to a form more readable by humans, such as documentation. Conventionally, organizations have handled documentation as material to be written and distributed in a static format, but such static documentation may quickly fall out of date when institutional knowledge grows, is updated, or otherwise changes. Consequently, documentation generation technology has emerged for dynamically authoring documentation according to the current state of underlying systems and knowledge bases described by the documentation.

Even using current documentation generation techniques, generating comprehensive, up-to-date documentation synchronized with institutional knowledge remains a challenge. Due to the massive, networked, and distributed nature of modern organizational knowledge bases, the task of determining changes to institutional knowledge, and updating generated documentation responsively based on the determined changes, may require substantial computational complexity and network traffic, burdening organizational computational resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

For many organizations, authoritative versions of the organization's institutional knowledge reside in knowledge bases implemented in formats not readily viewed or grasped by human users, such as a graph database containing schematic relations between knowledge rather than summaries thereof. Although documentation generation technology can dynamically author human-readable documentation from such knowledge bases, the growing and changing nature of institutional knowledge renders even dynamically generated documentation quickly obsolete. Therefore, in order to adapt documentation generation techniques to respond to changes in a knowledge base, systems and methods discussed herein are directed to implementing dynamic documentation generation, and more specifically implementing a documentation generation engine coupled to a mutation handler configured to traverse a knowledge base to derive selective views based on mutation operations disposed by a knowledge base and based on a query-writing framework configured with the purpose of compiling topically related institutional knowledge for human-readability, so as to efficiently generate documentation in a fashion responsive to knowledge base updates in real time.

Figure 1:
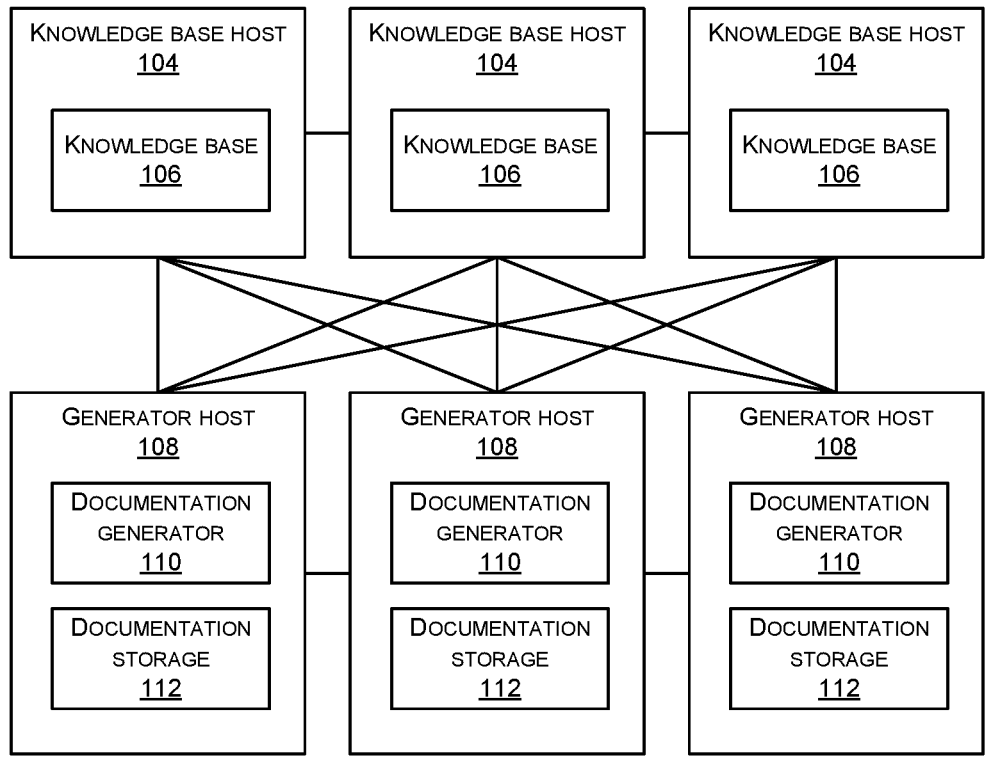
FIG. 1 illustrates a schematic diagram of a knowledge base hosting network according to example embodiments of the present disclosure.

FIG. 1 illustrates a schematic diagram of a knowledge base hosting network 100 according to example embodiments of the present disclosure. Example embodiments of the present disclosure may be implemented on networked computing hosts communicating over one or more private networks (such as an organizational intranet restricting access to client computing devices authenticated by security credentials of an organization) and/or one or more public networks (such as the Internet). Computing hosts 102 may include any networked computing systems, and some number of computing hosts 102 may host computing resources; among the computing hosts 102, any number of knowledge base hosts 104 may individually or collectively host a knowledge base 106 accessible by some number of other computing hosts over a private network.

The knowledge base 106 may include a set of data records stored on the knowledge base hosts 104, and may include a set of computer-executable instructions running on the knowledge base hosts 104 (subsequently referred to as a "knowledge base application," for brevity). The knowledge base application may configure one or more processors of knowledge base hosts 104 to perform operations upon the set of data records, such as querying data records or updating data records. The data records of the knowledge base 102 may be stored and updated across the networked computing hosts in an architecturally centralized or decentralized, single-copy or distributed, strongly consistent or weakly consistent, duplicated or replicated fashion, and may generally be stored according to any suitable database architecture known to persons skilled in the art.

Any number of client computing devices operated by users (these devices not being illustrated herein) possessing security credentials of the organization may, by running a set of computer-executable instructions which configure the client computing devices to run a user-operable frontend (subsequently referred to as a "frontend application," for brevity) connect to the networked computing hosts (such as by one or more connections over the one or more private networks) and send a request to the knowledge base application to perform a query operation, an update operation, and the like.

According to example embodiments of the present disclosure, the knowledge base 106 may be implemented as a graph database, wherein a set of data records may be stored in accordance with a schema including nodes and directional or non-directional edges connecting those nodes. Alternatively, the knowledge base 106 may be implemented as any relational or non-relational database (wherein a set of data records may be stored according to any suitable knowledge schema as known to persons skilled in the art), wherein a knowledge base application may be configured by an application programming interface ("API") to update records of the database according to mutation operations. According to such APIs, a mutation operation may configure the knowledge base application to perform some number of updates upon one or more data records of the knowledge base 106, such as inserting a record; modifying one or more fields of a record; deleting a record; changing a relation between one record and another; and the like.

For example, in the case that the knowledge base 106 is a graph database, a mutation may add a new node; add a new edge; connect an existing node to the new node by an existing edge or a new edge; delete an edge between two existing nodes; delete an existing node and delete an edge connected to the deleted node and/or relocate an edge connected to the deleted node to another node; update one or more fields of a node; update one or more fields of an edge, including changing a unidirectional edge to a bidirectional edge or vice versa, changing a unidirectional edge or a bidirectional edge to an undirected edge or vice versa, and changing the direction of a unidirectional edge; and the like in any combination and sequence thereof.

According to example embodiments of the present disclosure, among the computing hosts 102, any number of generator hosts 108 may individually or collectively host a documentation generator 110, which may include a set of computer-executable instructions running on the generator hosts (subsequently referred to as a "documentation generator application," for brevity). The documentation generator application may configure one or more processors of generator hosts 108 to traverse multiple records of the knowledge base and generate a set of documents based on the traversed records.

By way of example, a knowledge base for an organization specialized in the field of cybersecurity may contain institutional knowledge pertaining to the results of threat research. Threat researchers employed by an organization may investigate samples of malicious files, obtaining various threat analysis results by performing antivirus scans on the file sample; extracting information of the file sample for further automated or machine learning analysis, such as Exchangeable Image File Format ("EXIF") data or a deep hash of the file format; performing analysis of the file sample using proprietary tools; and the like. A knowledge schema of a knowledge base 106 may relate a record pertaining to a file sample to each of these above results, so that subsequently, this knowledge may be referenced to look up a threat analysis result to identify a particular malicious file, or identify threat analysis results that would be yielded by a particular malicious file.

Rather than requiring this knowledge to be subsequently referenced by queries to the knowledge base 106, organizations may configure a documentation generator application running on generator hosts to summarize records of the knowledge base, and relationships therebetween, as a series of human-readable reference documents. For example, in the example above, the documentation generator 110 may be configured to generate one reference document for each malicious file sample, the document identifying the malicious file and describing each threat analysis result derived from investigating the file sample. Commonly, documentation generators for knowledge bases (which should be distinguished from documentation generators for programming languages and source code) configure a computing system to derive a number of views of the knowledge base which collect records which are related to each other for documentation purposes, and then generate one reference document for each derived view. Such documentation generation techniques based on a knowledge base are generally known to persons skilled in the art and need not be reiterated herein.

A set of generated reference documents may be stored in a document storage 112. This may be a data structure recorded on storage of various computing hosts 102 as described above, without limitation. Updates made to documents in the document storage 112 are made computationally efficient by example embodiments of the present disclosure, as shall be described subsequently.

However, modern institutional knowledge generally occupies massive knowledge bases, increasingly stored on distributed, networked hosts, and increasingly subject to synchronization and consistency challenges. As a result, the knowledge base queries required for a documentation generator commonly demand knowledge base hosts to perform substantial computation and send substantial traffic across one or more networks. Across massive knowledge bases hosted across many hosts of one or more networks, such amplification of network traffic may cause normal computation and network traffic to become substantially inefficient. Even if the underlying knowledge base application and the underlying documentation generator application are designed to be as computationally efficient as possible in querying the knowledge base 1, some degree of redundant processing and network traffic across a massive knowledge base may be ultimately unavoidable.

Moreover, the documentation generator also repeatedly queries the knowledge base as records are written to, deleted from, and updated in the knowledge base. Since the documentation generator application runs in separate runtime environments from the knowledge base application, the documentation generator cannot directly access runtime information indicating how to retrieve each changed record in the knowledge base; which knowledge base hosts store the changed records; and whether an ongoing update to the knowledge base is only partway completed, requiring more time to finish. For these reasons, updating documentation based on a knowledge base can result in additional inefficient computational workload and inefficient queries of the knowledge base.

Consequently, it is undesired for the documentation generator to, whenever a change occurs at one or more records of the knowledge base, query the knowledge base on a naive basis in order to derive views required to generate updated documentation. Thus, example embodiments of the present disclosure further provide a views processing service interfacing with a mutation handler and a documentation generator application.

Figure 2:
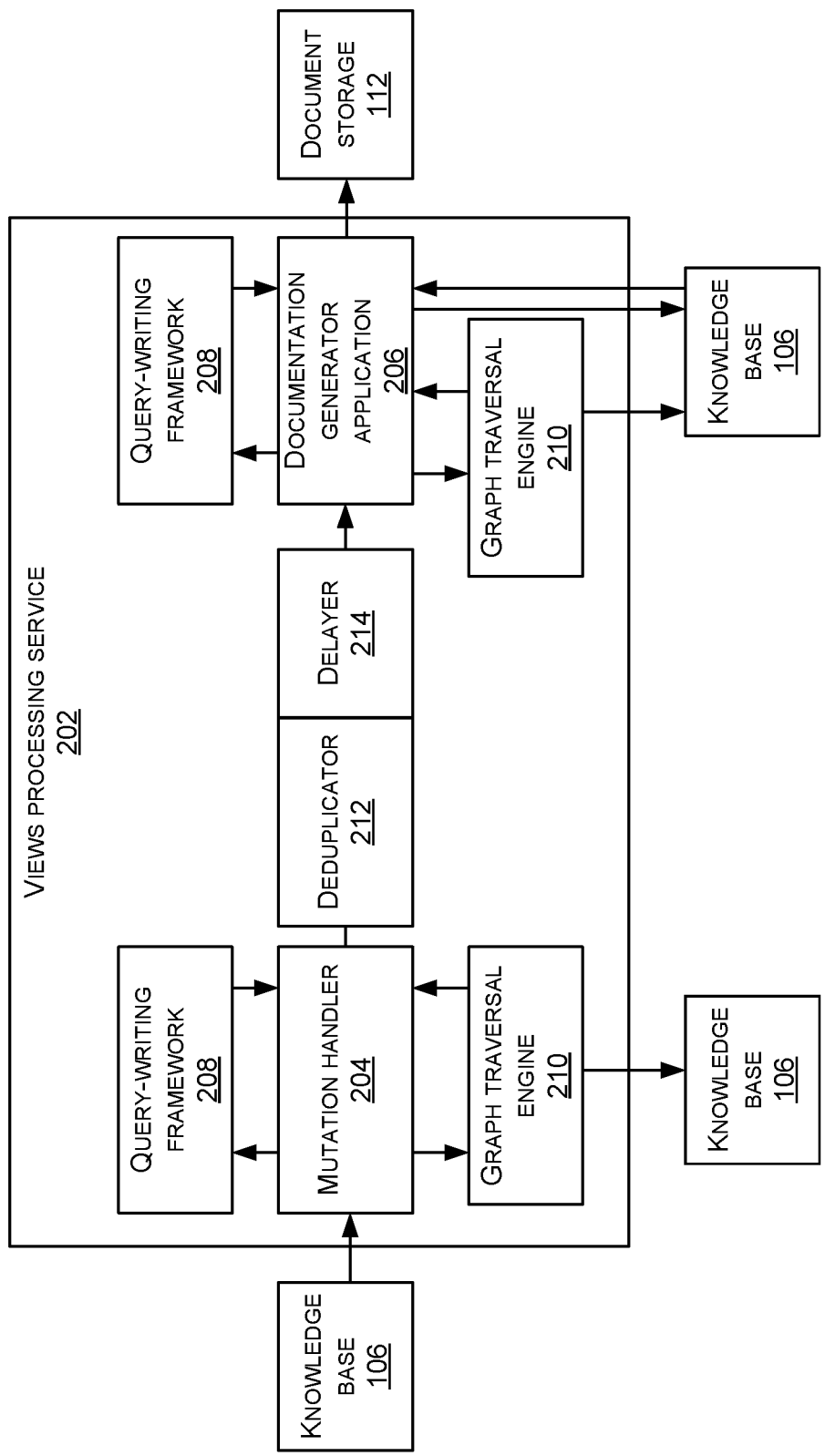
FIG. 2 illustrates a schematic diagram of a views processing service, a mutation handler, and a documentation generator application according to example embodiments of the present disclosure.

FIG. 2 illustrates a schematic diagram of a views processing service 202, a mutation handler 204, and a documentation generator 206 according to example embodiments of the present disclosure. The views processing service 202 may receive, from the knowledge base 106, dispositions of mutations performed on records of the knowledge base 106. The mutation handler 204 may, based on dispositions of mutations, determine a subset of the knowledge base to derive a mutation view based on records affected by a disposed mutation. The mutation handler may further batch one or more mutation views, allowing the documentation generator application to query the knowledge base based on the batched mutation views to read mutated records as the basis for generating an updated document. These processes shall be described in more detail subsequently.

According to example embodiments of the present disclosure, among the computing hosts, any number of views processing hosts may individually or collectively host a views processing service 202, which may include a set of computer-executable instructions running on the views processing hosts (subsequently referred to as a "views processing application," for brevity). The views processing application may configure one or more processors of views processing hosts to send information to and receive information from a knowledge base application as described above; load into memory, and run, a query-writing framework 208 as described subsequently; load into memory, and run, a graph traversal engine 210 as described subsequently; and send information to and receive information from a document storage 112 as described subsequently.

According to example embodiments of the present disclosure, among the computing hosts, any number of mutation handler hosts may individually or collectively host a mutation handler 204, which may include a set of computer-executable instructions running on the mutation handler hosts (subsequently referred to as a "mutation handler application," for brevity). The mutation handler application may configure one or more processors of mutation handler hosts to consume event messages from a knowledge base application as described above; load into memory, and run, a query-writing framework 208 as described subsequently; and load into memory, and run, a graph traversal engine 210 as described subsequently.

It should be understood that the documentation generator application, the views processing application, and the mutation handler application may share runtime contexts and may share information amongst each other without passing information over interfaces such as APIs. Thus, any number of generator hosts, views processing hosts, and mutation handler hosts as described above may be the same computing hosts and/or may be different computing hosts, in part or in full. According to some example embodiments of the present disclosure, any, some, or all computing hosts of the networked computing hosts may each be a generator host, a views processing host, and a mutation handler host all in one.

It should be understood that according to some example embodiments of the present disclosure, some operations performed by the views processing hosts and the mutation handler hosts may be delegated to a real-time streaming layer. Any number of middleware hosts may individually or collectively host a real-time streaming layer, which may include a set of computer-executable instructions running on the middleware hosts (subsequently referred to as a "streaming layer application," for brevity). The streaming layer application may configure one or more processors of middleware hosts to provide at least a first messaging interface for message-producing applications and a second messaging interface for message-consuming applications.

A streaming layer application, such as the Kafka framework provided by the Apache Software Foundation, generally configures a cluster of middleware hosts to receive messages from message-producing applications by the first messaging interface; organize the received messages according to logical partitions (which may be referred to as "topics" according to implementations of Kafka); and publish messages organized by logical partitions to any number of message-consuming applications subscribing to message publishing.

Thus, according to example embodiments of the present disclosure, any subsequent references to an "event message" and a "logical partition" may refer to such functions that middleware hosts are configured to perform by a streaming layer application. However, according to other example embodiments of the present disclosure, the views processing hosts and the mutation handler hosts may alternatively be configured to natively perform the functions of a streaming layer application without delegating these functions. Thus, no further reference will be made explicitly to a streaming layer for the purpose of understanding example embodiments of the present disclosure, and it should be understood that a streaming layer may or may not be present in reference to all subsequent example embodiments.

As described above, knowledge base hosts according to example embodiments of the present disclosure may be configured to update records of the database according to mutation operations. The knowledge base application may further configure one or more processors of knowledge base hosts to generate a disposition event message based on a disposed mutation operation. By way of example, the knowledge base application may configure a knowledge base host to generate event messages in accordance with a format configured by a streaming layer as described above, such as generating event messages in a producer role according to implementations of Kafka as described above.

According to example embodiments of the present disclosure, the mutation handler application may configure mutation handler hosts to consume disposition event messages from the knowledge base hosts. The mutation handler application may further configure mutation handler hosts to record events generated by the mutation handler in a logical partition (such as a topic according to implementations of Kafka as described above), which may enable the mutation handler to also generate root node event messages (as shall be described subsequently) in a producer role. The mutation handler application itself may configure the mutation handler hosts to perform these operations, or may call APIs of a streaming layer application, such as an implementation of Kafka, to configure the mutation handler hosts to perform these operations.

The views processing application may configure one or more processors of views processing hosts to consume disposition event messages from the knowledge base hosts; these consumed disposition event messages may be accessed by other applications sharing the same runtime context, such as the mutation handler application (as shall be described subsequently).

The views processing application may also configure one or more processors of views processing hosts to load a query-writing framework 208 into memory of the views processing hosts; the query-writing framework 208 may be accessed by other applications sharing the same runtime context, such as the mutation handler application and the documentation generator application (in a manner which shall be described subsequently).

The views processing application may also configure one or more processors of views processing hosts to load a graph traversal engine 210 into memory of the views processing hosts; the graph traversal engine 210 may be accessed by other applications sharing the same runtime context, such as the mutation handler application and the documentation generator application (in a manner which shall be described subsequently).

The mutation handler application may configure one or more processors of mutation handler hosts to consume disposition event messages received by the views processing application. Based on the disposition event messages, the mutation handler application may configure the mutation handler hosts to perform further operations which determine a subset of the knowledge base encompassing records affected by a disposed mutation (i.e., a selective view, as shall be described subsequently).

The mutation handler application may configure one or more processors of mutation handler hosts to apply the disposition event messages to a query-writing framework to output a first selective query, as shall be described subsequently. It should be understood that a query-writing framework generally describes any number of logical rules which may be applied to a set of data, such as records stored in a knowledge base, to retrieve at least a subset of the set of data for specialized read operations in an efficient fashion.

According to example embodiments of the present disclosure, a "selective query" should be understood as referring to one or more rules for retrieving a subset of records of a knowledge base, the selective query being generated by a query-writing framework according to techniques described as follows.

A query-writing framework according to example embodiments of the present disclosure includes one or more topical schemas, distinct from the overall schema of a knowledge base. A topical schema may describe one or more patterns that can occur in the schema of a knowledge base, limited to subsets of topically related records and describing relationships of these records to other records of interest, such that a set of related records described by the topical schema can be understood by human readers as being related in topic. The query-writing framework, in conjunction with records identified by an event message, can derive a set of queries which cause a knowledge base to return all records topically related by a schema of a query-writing framework, while minimizing excess querying which may unnecessarily amplify computational workload and network traffic. A topical schema of a query-writing framework and a schema of a knowledge base can be alike in format, and a topical schema of a query-writing framework can be configured using a domain-specific language as shall be described subsequently.

By way of example, given a knowledge base implemented as a graph database, a topical schema may be applied to any node, and may describe a graph traversal which can be performed at that node, the graph traversal being described without limitation as to a node from which the traversal may start, but with limitation as to nodes to which the traversal may reach, specified by a node type list containing one or more schema characterizations of such nodes, and/or with limitation as to edges over which the traversal may proceed, specified by an edge type list containing one or more schema characterizations of such edges. Each of the node type list and the edge type list may contain one or more values of one or more particular fields of, respectively, nodes and edges according to a schema of the knowledge base.

Furthermore, a topical schema may describe one or more nodes and/or one or more edges which should not be traversed, so that certain known nodes and/or edges can be excluded from traversal without expending computational power to compare against the node type list and against the edge type list. Such nodes to be excluded can be specified as a node matching filter, and such edges to be excluded can be specified as an edge matching filter.

Furthermore, a topical schema may describe a traversals list. A traversals list can describe each traversal to be made from the node described by the topical schema, therefore defining some number of levels above the node and/or levels below the node. The traversals list may, furthermore, point back to the topical schema itself by a recursive self-reference, such that, whenever each traversal from a node to reach some number of nodes, the same topical schema to be applied to each node reached, potentially resulting in further traversals from each node reached. In this fashion, applying the topical schema to a node of knowledge base may cause a subgraph to be defined by a number of iterations of recursive traversals, starting at the applied node and traversing recursively across a number of levels of nodes as defined by a schema of the knowledge base.

It should be understood that such a topical schema can be applied to any node, and the same node type list, the same edge type list, and the same node matching filter, when applied to different nodes, can respectively result in traversals over different subsets of edges to different subsets of nodes, where those subsets of nodes are also different sizes. A topical schema need not specify a number of traversals to perform from any given node, and need not specify the ultimate depth of a traversal from root to leaves; ultimately, the topical schema can configure a query-writing framework, as described herein, to parse the topical schema to generate a selective query which a graph traversal engine can perform.

A graph traversal engine can perform a selective query by making one or more queries to the knowledge base, first querying a starting node of the graph, then following a subset of edges connected to the starting node and iteratively querying subsequently traversed nodes (in accordance with parsing the recursive traversals list of a topical schema as described above), ultimately returning a subgraph based on edges from the starting node. Thus, topical schemas a query-writing framework may describe edges which should be followed from a starting node, to the exclusion of other edges which could be traversed from the same starting node; may describe nodes which should be reached from a starting node, to the exclusion of other nodes which could be reached from a starting node; and may furthermore describe edges which should not be followed and nodes which should not be reached from a starting node, thus minimizing the amount of computational workload required to perform a graph traversal. Whereas, in a conventional, non-selective query to a normalized graph database, each edge connected to a node may be traversed and each node connected to a node may be reached, a first selective query, during each of its recursive traversals, may cause traversal of only a subset of each edge and nodes connected to a node, limiting the subgraph that will be returned from a starting node, or may cause traversal of each edge and node connected to a node, constrained by a node type list, an edge type list, and/or a node matching filter as may be specified by a topical schema parsed to generate the selective query.

For the purpose of understanding example embodiments of the present disclosure, a "subset" of edges should be understood as being a proper subset or an improper subset of edges connected to a particular node. In other words, the subset can include all edges connected to the particular node (i.e., an improper subset thereof), or can include fewer than all edges connected to the particular node (i.e., a proper subset thereof). A "subset" of nodes can be understood similarly as being a proper subset or an improper subset of nodes connected to a particular node.

However, a "subset" of records or a "subset" of data should be understood as being a proper subset of records or data in a knowledge base.

For example, a first selective query may cause only upward traversal from starting nodes, iteratively returning parent nodes until reaching root notes where no more parent nodes may be found. In this fashion, for a set of starting nodes identified by disposition event messages, the first selective query may cause traversal to all nodes connecting the starting nodes to their respective root nodes in a knowledge base implemented as a graph database.

For example, as described above, a knowledge base pertaining to threat research may include a node describing a malicious file sample, connected to multiple nodes describing results of different threat analyses performed on the same malicious file sample. However, file sample nodes, and results nodes, may also be connected to other nodes not describing the file sample itself. For example, in a normalized graph database, all such connecting edges may carry equal weight, and thus a naive query may need to traverse many such irrelevant nodes to return a subgraph containing only nodes that describe a file sample.

A query-writing framework, in contrast, if configured with the purpose of compiling topically related institutional knowledge for human-readability, may describe a topical schema logic describing the relevant nodes that are expected to be connected to a file sample node, and the characteristics (such as directionality) of the edges which should be traversed to find those nodes. Thus, a selective query parsed by a query-writing framework and run by a graph traversal engine, in contrast to a naive query, may be limited to returning a subgraph of nodes which are topically related, without returning other, irrelevant nodes. Such a subgraph of nodes which are topically related may be referred to herein as a selective view.

In this fashion, given a knowledge base implemented as a graph database, the graph traversal engine, by performing a first selective query, may return a topically related subgraph for the documentation generator application, with reduced computing workload and reduced network traffic compared to a naive query. Moreover, given a knowledge base implemented as any other suitable database as known to persons skilled in the art, a database querying engine may be similarly configured to perform a first selective query to return a topically related subset of records, with reduced computing workload and reduced network traffic compared to a naive query.

For the purpose of understanding example embodiments of the present disclosure, a "traversal" should not be understood in the pure sense of depth-first traversal, breadth-first traversal, and other such graph traversal or search algorithms which cause traversal of all edges connected to a node, while not limiting the nodes traversed in any way. Thus, a "traversal" as described herein may be further qualified as a "selective traversal," in that it is not a full traversal of a graph database, and not a full traversal of all edges connected to every node. Moreover, a selective traversal performed by the mutation handler application may be further qualified as a "selective upward traversal," in that it only traverse upwards to parent nodes, and not downward to child nodes.

Moreover, for the purpose of understanding example embodiments of the present disclosure, it should be understood that whereas one or more queries to a graph database may cause traversal, a traversal herein is the consequence of a query, rather than the query itself. Whereas some graph database APIs may include a non-parameterized traversal function, causing the entire graph database to be traversed in one query-like operation, "traversals" as described herein should not be understood as invoking such non-parameterized traversal functions, but rather invoking parameterized query functions.

A topical schema making up a query-writing framework may be configured by specifying rules using a domain-specific language ("DSL"), such as any custom DSL defined according to a knowledge base framework. Persons skilled in the art will appreciate that DSLs may be tailored to the context of how a knowledge base is implemented according to example embodiments of the present disclosure, and therefore different configurations of knowledge bases may require different DSLs to be used in configuring a query-writing framework. However, a DSL may be decoupled from the knowledge base schema, and thus configuring a query-writing framework may not require knowledge of the underlying knowledge base schema. Persons skilled in the art will further appreciate that a DSL may be any markup language enabling information to be notated with different semantic meanings (so that, for example, some data from knowledge base records may be notated as topically related, while other data may be notated otherwise). Thus, the query-writing framework can configure one or more processors of mutation handler hosts to parse a topical schema as specified according to a DSL, and write a selective query object in memory; apply the disposition event messages to the selective query object in memory, identifying a record affected by a disposed mutation as a starting node; and generate a first selective query wherein the parsed topical schema will be applied to the starting node first, then be further applied recursively.

The mutation handler may configure one or more processors of mutation handler hosts to forward a first selective query to the graph traversal engine running on the mutation handler hosts. The graph traversal engine may configure the mutation handler hosts to query the knowledge base with the first selective query. In response, the knowledge base application may configure the knowledge base hosts to perform the first selective query, and return some number of records to the mutation handler. The first selective query may cause the mutation handler hosts to query the knowledge base one or more times. For example, given a knowledge base implemented as a graph database, starting from a set of starting nodes, a query may traverse up one level to parents of those nodes; then, each successive query may iteratively traverse up to parents of the preceding nodes until all nodes are root nodes.

The mutation handler hosts may record a root node returned from the first selective query in a logical partition. The mutation handler hosts may further be configured to publish a root node event message for each recorded root node, each root node event message including a respective root node. A published root node event message may ultimately be received by the documentation generator application, in a consumer role. Upon the generator host consuming a message including a root node, the generator host may send a second selective query to the knowledge base hosts to retrieve records to be locally stored as a basis for generating one or more mutation-responsive updated documents, as shall be described subsequently.

However, before the mutation handler hosts publish the root node event messages, each root node event message may be further processed by a deduplicator 212 and a delayer 214 each running on the generator hosts, the views processing hosts, and the mutation handler hosts. The purpose of these elements shall be described subsequently.

The second selective query, unlike the first selective query, retrieves updated records of the knowledge base based on topically related records, rather than retrieve topically related records based on updated records. Thus, given a knowledge base implemented as a graph database, the second selective query may start at root nodes recorded by a mutation handler host, and then traverse edges connected to the root nodes to return each updated child node of those root nodes. Thus, the second selective query may be further qualified as a "selective downward traversal," in contrast to the upward traversal of the first selective query.

The first selective query may cause some number of queries to the knowledge base, incurring computational workload and network traffic. Moreover, while the second selective query may be limited according to the same topical schema of the query-writing framework, the second selective query being downward rather than upward means that it may cause traversal of the entire depth of child nodes of the starting root nodes. Therefore the second selective query is expected to be larger in scope than the first selective query, and may result in substantially further traversal, even more computational workload, and even more network traffic than the first selective query. Consequently, according to example embodiments of the present disclosure, the documentation generator application further includes a cache.

The cache may configure the generator hosts to locally cache at least some records of a knowledge base from prior queries, and process at least some parts of a second selective query by returning one or more cached records rather than forwarding those parts of the query to the knowledge base hosts. In this fashion, the generator hosts may be configured to alleviate some computation workload and network traffic that would otherwise be incurred by the knowledge base hosts in processing a first selective query and/or second selective query. It should be understood that for the purpose of implementing example embodiments of the present disclosure, the cache need not configure the generator hosts to locally cache all records of a knowledge base from prior queries; the cache may configure the generator hosts to exclude some records of the knowledge base from caching.

However, since the cache may configure the generator hosts to retain cached records for some time before they are refreshed, it is not desired for a first selective query or a second selective query to retrieve stale, long-retained cached records, which may no longer be consistent with the corresponding records of the knowledge base. Therefore, a deduplicator according to example embodiments of the present disclosure further configures any, some, or all of the generator hosts, the views processing hosts, and the mutation handler hosts to schedule a delayed publishing time for a root node event message.

It should be understood that each event message according to example embodiments of the present disclosure may include a publishing time; event messages may be stored ordered by publishing time before they are published; and event messages may be scheduled to be published (by a messages publishing framework implemented in any suitable manner as known to persons skilled in the art, which does not need to be described in further detail herein for understanding of the present disclosure) to be consumed by a documentation generator application upon arrival or passing of the publishing time.

Thus, a delayer may include a set of computer-executable instructions which configure one or more processors of one or more computing hosts to add a delay period to a publishing time. In order to avoid the documentation generator application retrieving long-retained cached records, the delayer may configure the delay period as a time period longer than a cache retention window. The cache retention window may refer to a maximum time period for which the cache is configured to retain cached records.

In order for prevent the documentation generator application from processing duplicate event messages, a deduplicator may further include a set of computer-executable instructions which configure one or more processors of one or more computing hosts (whether a generator host, a views processing host, or a mutation handler host) to retain an earliest copy of an event message (i.e., whenever an event message is to be published, if no copies of that event message are already retained, it is an earliest copy) for a message retention window before passing it to the delayer. While a message is retained, the deduplicator discards all subsequent copies of the same message. The delayer is further configured with knowledge of the message retention window and its length, and further configures the delay period as a time period longer than a cache retention window and a message retention window combined.

Furthermore, it should be understood that the documentation generator may use the event message publishing time as a read timestamp for a first selective query or a second selective query. According to example embodiments of the present disclosure, the knowledge base may be configured to perform a snapshot read operation, which guarantees that all read operations based on a timestamp will return a consistent state of the knowledge base as committed at the timestamped time.

However, persons skilled in the art will appreciate that, among different knowledge base hosts, some amount of clock skew may exist, causing timestamps to be applied with potentially some degree of inconsistency among different knowledge base hosts. Therefore, administrators of such networked computing hosts, particular those hosting databases and knowledge bases, generally need to configure the computing hosts to guarantee a maximum clock skew. Therefore, according to example embodiments of the present disclosure, the delayer is further configured with knowledge of a maximum clock skew of the knowledge base hosts, and further configures the delay period as a time period at least as long or longer than a cache retention window, a message retention window, and a maximum clock skew combined.

Therefore, after a deduplicator and a delayer have acted on a root node event message, the mutation handler hosts may publish the root node event message timestamped with a delayed publishing time, the delayed publishing time being a current time delayed by a cache retention window, a message retention window, and a maximum clock skew.

Subsequently, the documentation generator application may configure one or more processors of generator hosts to consume the published root node event message, similar to the views processing hosts consuming event messages as described above.

The documentation generator application may also configure one or more processors of generator hosts to load a query-writing framework into memory of the generator hosts, similar to the views processing hosts loading a query-writing framework into memory as described above.

The documentation generator application may also configure one or more processors of generator hosts to load a graph traversal engine into memory of the generator hosts, similar to the views processing hosts loading a query-writing framework into memory as described above.

The documentation generator application may also configure one or more processors of generator hosts to apply the root node event messages to a query-writing framework to output a second selective query. The query-writing framework may be substantially similar as that described above, which generally describes a set of any number of logical rules which may be applied to a set of normalized data, such as records stored in a knowledge base, to retrieve at least a subset of the normalized data for specialized read operations in an efficient fashion.

As described above, a "selective query" once again refers to describe one or more patterns that can occur in the schema of a knowledge base, limited to subsets of topically related records and describing relationships of these records to other records of interest, such that a set of relate records described by the topical schema can be understood by human readers as being related in topic.

Again, by way of example, given a knowledge base implemented as a graph database, a selective query may include one or more queries to the knowledge base, first querying a starting node of the graph, then following a subset of edges connected to the starting node and iteratively querying subsequently traversed nodes, ultimately returning a subgraph based on edges from the starting node. A second selective query may again cause traversal of only a subset of each edge connected to a node, limiting the subgraph that will be returned from a starting node, though less limited than a first selective query as described above.

For example, a second selective query may cause only downward traversal from starting root nodes, iteratively returning child nodes until reaching all leaf notes where no more child nodes may be found. In this fashion, for a set of starting root nodes identified by root node event messages, the second selective query may cause traversal of the full depth of all nodes connecting each starting root node to each of their ultimate child nodes in a knowledge base implemented as a graph database.

For example, as described above, a knowledge base pertaining to threat research may include a node describing a malicious file sample, connected to multiple child nodes describing results of different threat analyses performed on the same malicious file sample. A second selective query may yield all such child nodes describing results of different threat analyses. However, file sample nodes, and results nodes, may also be connected to other nodes not describing the file sample itself. For example, in a normalized graph database, all such connecting edges may carry equal weight, and thus a naive query may need to traverse many such irrelevant nodes to return a subgraph containing only nodes that describe a file sample.

In this fashion, given a knowledge base implemented as a graph database, the graph traversal engine, by performing a second selective query, may return a topically related subgraph for the documentation generator application, with reduced computing workload and reduced network traffic compared to a naive query. Moreover, given a knowledge base implemented as any other suitable database as known to persons skilled in the art, a database querying engine may be similarly configured to perform a second selective query to return a topically related subset of records, with reduced computing workload and reduced network traffic compared to a naive query.

However, it should be understood that the first selective query and the second selective query need not be performed solely by the graph traversal engine making queries to a knowledge base. Additionally, the first selective query and/or the second selective query can be further handled by the cache loaded into the memory of the generator hosts as described above. The graph traversal engine first matches at least part of the first selective query and/or the second selective query against the cache, which returns cached records to the extent possible ("cache hits") to alleviate some querying of the knowledge base, since, among those records stored in the cache, the cache may store some, but most likely not all, records to be traversed by the first selective query and/or the second selective query. The cache returns cache misses in response to those parts of the first selective query and/or the second selective query which do not match cached records, and records missed in the cache are then retrieved from a knowledge base. In this fashion, computing workload and network traffic over the knowledge base hosts are further reduced.

As described above, since the delayed publishing time has caused at least one full period of the cache retention window to lapse between the root node event message being written and being published, the likelihood of the cache hits being stale is minimized.

To the extent that the first selective query and/or the second selective query cannot be performed by the cache, those parts of the first selective query and/or the second selective query which returned cache misses are forwarded to the knowledge base hosts in the form of one or more snapshot reads by the graph traversal engine, the one or more snapshot reads being timestamped with the delayed publishing time as described above. Thus, those parts of the first selective query and/or the second selective query which cannot be serviced by the cache are read from the knowledge base as committed at the time of the delayed publishing time, obtaining consistency between reads.

After the knowledge base hosts return records which satisfy the cache misses of the first selective query and/or the second selective query, and the returned records are locally stored, the documentation generator application may configure one or more processors of the generator hosts to update one or more reference documents of a document storage. As described above, a document storage may be recorded on storage of the generator hosts. The documentation generator application may configure one or more processors of the generator hosts to update one or more documents of the document storage for each record returned from the first selective query and/or the second selective query. For example, records of a selective view as described above may collectively correspond to one document of the document storage, or multiple documents of the document storage, to be updated. Techniques for updating generated documents based on knowledge base records are as known to persons skilled in the art and need not be reiterated herein.

However, it should be understood that, due to the real-time and time-sensitive nature of published messages which are consumed by subscribers to drive the selective queries, as well as due to the fact that a knowledge base may be updated at any time in real time concurrently with such selective queries (details of which need not be detailed herein for understanding the present disclosure), the generator hosts may be configured to update the document storage concurrently based on multiple selective views, which may have been derived at different times. Moreover, concurrent updates to the document storage, which may furthermore be performed by different computing hosts, may concurrently affect the same documents.

According to example embodiments of the present disclosure, it is desired to achieve consistency between multiple concurrent updates, though, in practice, it is expected that concurrent updates to the same documents will be rare. Therefore, according to example embodiments of the present disclosure, the generator host may be configured to update the document storage in accordance with optimistic concurrency control based on versioning of selective views.

Figure 3:
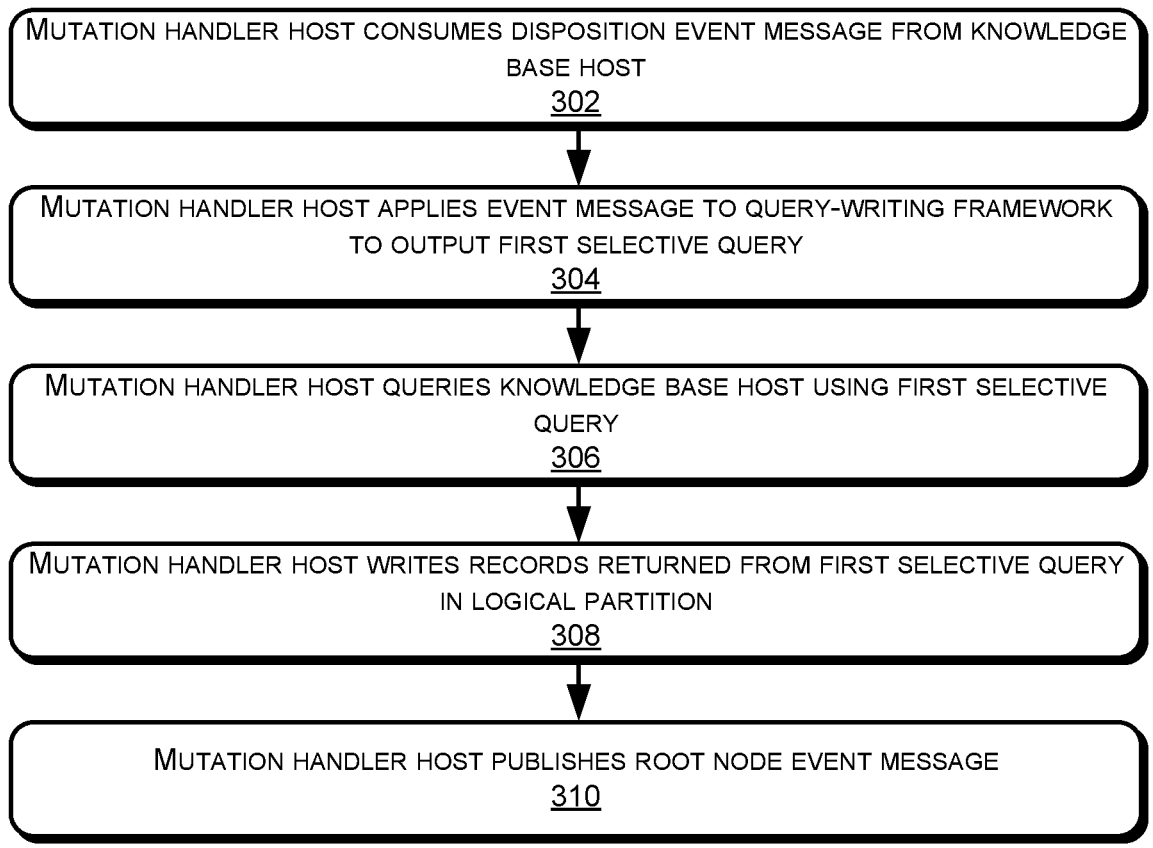
FIG. 3 illustrates a flowchart of a mutation handling method according to example embodiments of the present disclosure.

FIG. 3 illustrates a flowchart of a mutation handling method 300 according to example embodiments of the present disclosure.

At a step 302, a mutation handler host consumes a disposition event message from a knowledge base host.

Alternatively, a views processing host may consume disposition event messages from the knowledge base host; these consumed disposition event messages may be accessed by other applications sharing the same runtime context, such as the mutation handler application (as shall be described subsequently).

The mutation handler host may further record events generated by the mutation handler in a logical partition (such as a topic according to implementations of Kafka as described above), which may enable the mutation handler to also generate root node event messages in a producer role. The mutation handler host may perform these operations by executing native computer-executable instructions, or may call APIs of a streaming layer application, such as an implementation of Kafka, to perform these operations.

For understanding the subsequent steps, it should be understood that the mutation handler host may also have loaded a query-writing framework into memory; and may also have loaded a graph traversal engine into memory in the event that the knowledge base host is hosting a graph database.

At a step 304, the mutation handler host applies the event message to a query-writing framework to output a first selective query.

As mentioned above, it should be understood that a query-writing framework generally describes a set of any number of logical rules which may be applied to a set of normalized data, such as records stored in a knowledge base, to retrieve at least a subset of the normalized data for specialized read operations in an efficient fashion.

By way of example, given a knowledge base implemented as a graph database, a selective query may include one or more queries to the knowledge base, first querying a starting node of the graph, then following a subset of edges connected to the starting node and iteratively querying subsequently traversed nodes, ultimately returning a subgraph based on edges from the starting node. Thus, a query-writing framework may describe edges which should be followed from a starting node, to the exclusion of other edges, thus minimizing the amount of computational workload required to perform a graph traversal. Whereas, in a conventional query to a normalized graph database, each edge connected to a node may be traversed, a first selective query may cause traversal of only a subset of each edge connected to a node, limiting the subgraph that will be returned from a starting node.

For example, a first selective query may cause only upward traversal from starting nodes, iteratively returning parent nodes until reaching root notes where no more parent nodes may be found. In this fashion, for a set of starting nodes identified by disposition event messages, the first selective query may cause traversal to all nodes connecting the starting nodes to their respective root nodes in a knowledge base implemented as a graph database.

For example, as described above, a knowledge base pertaining to threat research may include a node describing a malicious file sample, connected to multiple nodes describing results of different threat analyses performed on the same malicious file sample. However, file sample nodes, and results nodes, may also be connected to other nodes not describing the file sample itself. For example, in a normalized graph database, all such connecting edges may carry equal weight, and thus a naive query may need to traverse many such irrelevant nodes to return a subgraph containing only nodes that describe a file sample.

A query-writing framework, in contrast, if configured with the purpose of compiling topically related institutional knowledge for human-readability, may describe a schema logic describing the relevant nodes that are expected to be connected to a file sample node, and the characteristics (such as directionality) of the edges which should be traversed to find those nodes. Thus, a selective query, in contrast to a naive query, may be limited to returning a subgraph of nodes which are topically related, without returning other, irrelevant nodes. Such a subgraph of nodes which are topically related may be referred to as a selective view.

A schema making up a query-writing framework may be configured by specifying rules using a domain-specific language ("DSL"), such as any custom DSL defined according to a knowledge base framework. Persons skilled in the art will appreciate that DSLs may be tailored to the context of how a knowledge base is implemented according to example embodiments of the present disclosure, and therefore different configurations of knowledge bases may require different DSLs to be used in configuring a query-writing framework. However, a DSL may be decoupled from the knowledge base schema, and thus configuring a query-writing framework may not require knowledge of the underlying knowledge base schema. Persons skilled in the art will further appreciate that a DSL may be any markup language enabling information to be notated with different semantic meanings (so that, for example, some data from knowledge base records may be notated as topically related, while other data may be notated otherwise).

At a step 306, the mutation handler host queries the knowledge base host using the first selective query.

Given a knowledge base implemented as a graph database, the graph traversal engine, by performing a first selective query, may return a topically related subgraph for the documentation generator application, with reduced computing workload and reduced network traffic compared to a naive query. The mutation handler host may forward a first selective query to the graph traversal engine running on the mutation handler host. The graph traversal engine may configure the mutation handler host to query the knowledge base with the first selective query.

Moreover, given a knowledge base implemented as any other suitable database as known to persons skilled in the art, a database querying engine may be similarly configured to perform a first selective query to return a topically related subset of records, with reduced computing workload and reduced network traffic compared to a naive query.

In response to a query by traversal or otherwise, the knowledge base host may perform the first selective query, and return some number of records to the mutation handler. The first selective query may cause the mutation handler host to query the knowledge base one or more times. For example, given a knowledge base implemented as a graph database, starting from a set of starting nodes, a query may traverse up one level to parents of those nodes; then, each successive query may iteratively traverse up to parents of the preceding nodes until all nodes are root nodes.

Moreover, according to some example embodiments of the present disclosure, it should be understood that the first selective query need not be performed solely by the graph traversal engine making queries to a knowledge base. Additionally, the first selective query can be further handled by the cache loaded into the memory of the generator host as described above, in an analogous fashion as the second selective query being handled by the same cache as described below with reference to step 406 of FIG. 4.

At a step 308, the mutation handler host writes records returned from the first selective query in a logical partition.

For example, given a knowledge base implemented as a graph database, the mutation handler host may record a root node returned from the first selective query in a logical partition.

At a step 310, the mutation handler host publishes a root node event message.

The root node event message may include a respective root node. The published root node event message may ultimately be received by the documentation generator application, in a consumer role. However, before the mutation handler host publishes the root node event messages, each root node event message may be further processed by a deduplicator and a delayer each running on the mutation handler host.

Each event message according to example embodiments of the present disclosure may include a publishing time; event messages may be stored ordered by publishing time before they are published; and event messages may be scheduled to be published (by a messages publishing framework implemented in any suitable manner as known to persons skilled in the art, which does not need to be described in further detail herein for understanding of the present disclosure) to be consumed by a documentation generator application upon arrival or passing of the publishing time.

Thus, a delayer may configure the mutation handler host to add a delay period to a publishing time. In order to avoid the documentation generator application retrieving long-retained cached records, the delayer may configure the delay period as a time period longer than a cache retention window. The cache retention window may refer to a maximum time period for which the cache is configured to retain cached records.

In order for prevent the documentation generator host from processing duplicate event messages, a deduplicator may further configure the mutation handler host to retain an earliest copy of an event message (i.e., whenever an event message is to be published, if no copies of that event message are already retained, it is an earliest copy) for a message retention window before passing it to the delayer. While a message is retained, the deduplicator discards all subsequent copies of the same message. The delayer is further configured with knowledge of the message retention window and its length, and further configures the delay period as a time period longer than a cache retention window and a message retention window combined.

Furthermore, the delayer may be further configured with knowledge of a maximum clock skew of the knowledge base hosts, and further configures the delay period as a time period at least as long or longer than a cache retention window, a message retention window, and a maximum clock skew combined.

Therefore, after a deduplicator and a delayer have acted on a root node event message, the mutation handler host may publish the root node event message timestamped with a delayed publishing time, the delayed publishing time being a current time delayed by a cache retention window, a message retention window, and a maximum clock skew.

After the generator host consumes a message including these root nodes, it may send a second selective query to the knowledge base hosts to generate one or more mutation-responsive updated documents, as shall be described subsequently.

Figure 4:
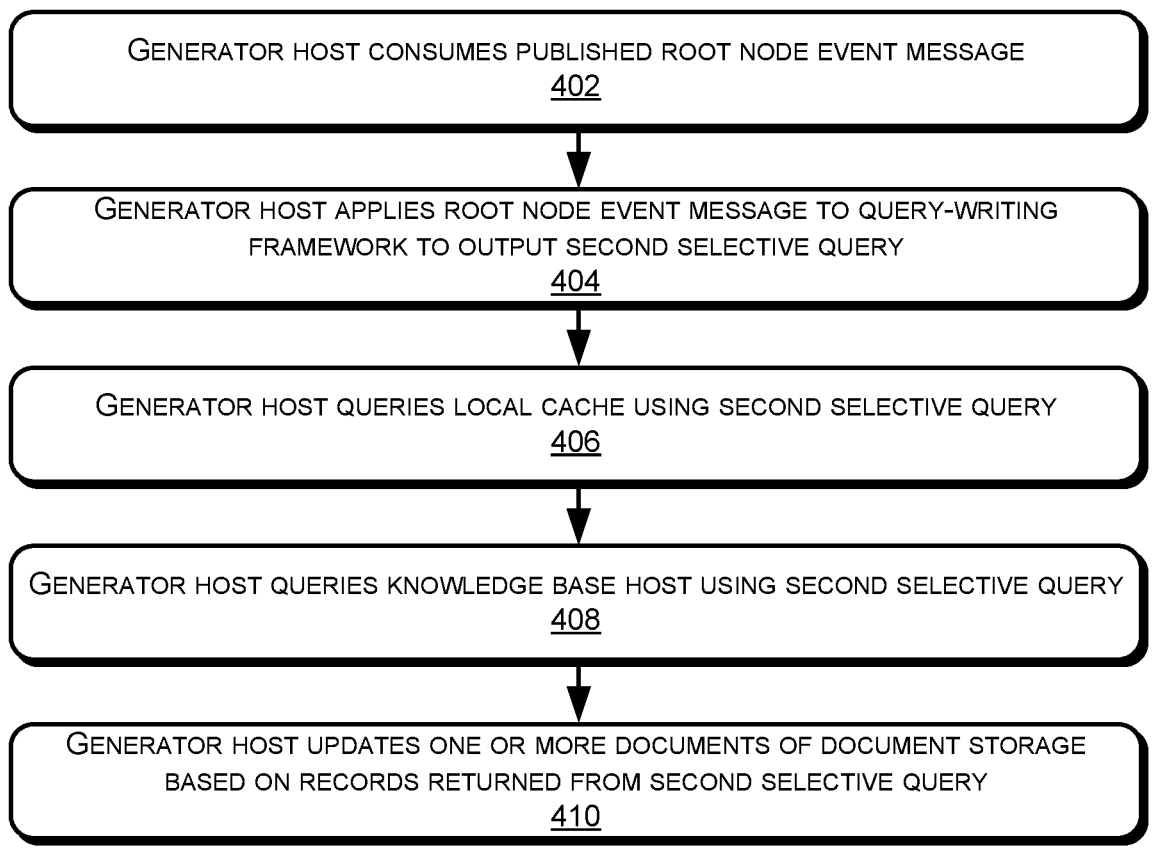
FIG. 4 illustrates a flowchart of a documentation generating method according to example embodiments of the present disclosure.

FIG. 4 illustrates a flowchart of a documentation generating method 400 according to example embodiments of the present disclosure.

At a step 402, a generator host consumes a published root node event message.

The generator host may consume the event message similar to the views processing host or the mutation handler host consuming event messages as described above.

For understanding the subsequent steps, it should be understood that the generator host may also have loaded a query-writing framework into memory; and may also have loaded a graph traversal engine into memory in the event that the knowledge base host is hosting a graph database.

At a step 404, the generator host applies the root node event message to a query-writing framework to output a second selective query.

The query-writing framework may be substantially similar as that described above with reference to FIG. 3, which generally describes a set of any number of logical rules which may be applied to a set of normalized data, such as records stored in a knowledge base, to retrieve at least a subset of the normalized data for specialized read operations in an efficient fashion.

Again, by way of example, given a knowledge base implemented as a graph database, a selective query may include one or more queries to the knowledge base, first querying a starting node of the graph, then following a subset of edges connected to the starting node and iteratively querying subsequently traversed nodes, ultimately returning a subgraph based on edges from the starting node. A second selective query may again cause traversal of only a subset of each edge connected to a node, limiting the subgraph that will be returned from a starting node, though less limited than a first selective query as described above.

For example, a second selective query may cause only downward traversal from starting root nodes, iteratively returning child nodes until reaching all leaf notes where no more child nodes may be found. In this fashion, for a set of starting root nodes identified by root node event messages, the second selective query may cause traversal of the full depth of all nodes connecting each starting root node to each of their ultimate child nodes in a knowledge base implemented as a graph database.

For example, as described above, a knowledge base pertaining to threat research may include a node describing a malicious file sample, connected to multiple child nodes describing results of different threat analyses performed on the same malicious file sample. A second selective query may yield all such child nodes describing results of different threat analyses. However, file sample nodes, and results nodes, may also be connected to other nodes not describing the file sample itself. For example, in a normalized graph database, all such connecting edges may carry equal weight, and thus a naive query may need to traverse many such irrelevant nodes to return a subgraph containing only nodes that describe a file sample.

At a step 406, the generator host queries a local cache using the second selective query.

At a step 408, the generator host queries a knowledge base host using the second selective query.

Given a knowledge base implemented as a graph database, the graph traversal engine, by performing a second selective query, may return a topically related subgraph for the documentation generator application, with reduced computing workload and reduced network traffic compared to a naive query. Moreover, given a knowledge base implemented as any other suitable database as known to persons skilled in the art, a database querying engine may be similarly configured to perform a second selective query to return a topically related subset of records, with reduced computing workload and reduced network traffic compared to a naive query.

However, it should be understood that the second selective query is not performed solely by the graph traversal engine making queries to a knowledge base. Additionally, the second selective query is further handled by the cache loaded into the memory of the generator host as described above. The graph traversal engine first matches at least part of the second selective query against the cache, which returns cached records to the extent possible ("cache hits") to alleviate some querying of the knowledge base, since, among those records stored in the cache, the cache may store some, but most likely not all, records to be traversed by the second selective query. The cache returns cache misses in response to those parts of the second selective query which do not match cached records, and records missed in the cache are then retrieved from a knowledge base. In this fashion, computing workload and network traffic over the knowledge base host are further reduced.

As described above, since the delayed publishing time has caused at least one full period of the cache retention window to lapse between the root node event message being written and being published, the likelihood of the cache hits being stale is minimized.

To the extent that the second selective query cannot be performed by the cache, those parts of the second selective query which returned cache misses are forwarded to the knowledge base host in the form of one or more snapshot reads by the graph traversal engine, the one or more snapshot reads being timestamped with the delayed publishing time.

The knowledge base host may be configured to perform a snapshot read operation, which guarantees that all read operations based on a timestamp will return a consistent state of the knowledge base as committed at the timestamped time. The documentation generator may use the event message publishing time as a read timestamp for a second selective query. Thus, those parts of the second selective query which cannot be serviced by the cache are read from the knowledge base as committed at the time of the delayed publishing time, obtaining consistency between reads.

At a step 410, the generator host updates one or more documents of a document storage based on records returned from the second selective query.

After the knowledge base host returns records which satisfy the cache misses of the second selective query, the generator host may update one or more reference documents of a document storage. A document storage may be recorded on storage of the generator host. The documentation generator application may configure one or more processors of the generator host to update one or more documents of the document storage for each record returned from the second selective query. For example, records of a selective view as described above may collectively correspond to one document of the document storage, or multiple documents of the document storage, to be updated. Techniques for updating generated documents based on knowledge base records are as known to persons skilled in the art and need not be reiterated herein.

Furthermore, the generator hosts may be configured to update the document storage concurrently based on multiple selective views, which may have been derived at different times. Moreover, concurrent updates to the document storage may concurrently affect the same documents. The generator host may be configured to update the document storage in accordance with optimistic concurrency control based on timestamps of selective views, the optimistic concurrency control being hosted on further computing hosts not illustrated herein.

The generator host may load into memory, and run, a concurrency control service. The concurrency control service may store a copy of the selective view having a latest timestamp among those views derived by the generator host. The concurrency control service may configure the generator host to, upon performing an update on any document of the document storage, compare a timestamp of the update to a latest timestamp of the stored selective view. The update should be rolled back if the timestamp of the update is earlier than the latest timestamp of the stored selective view.

Figure 5:
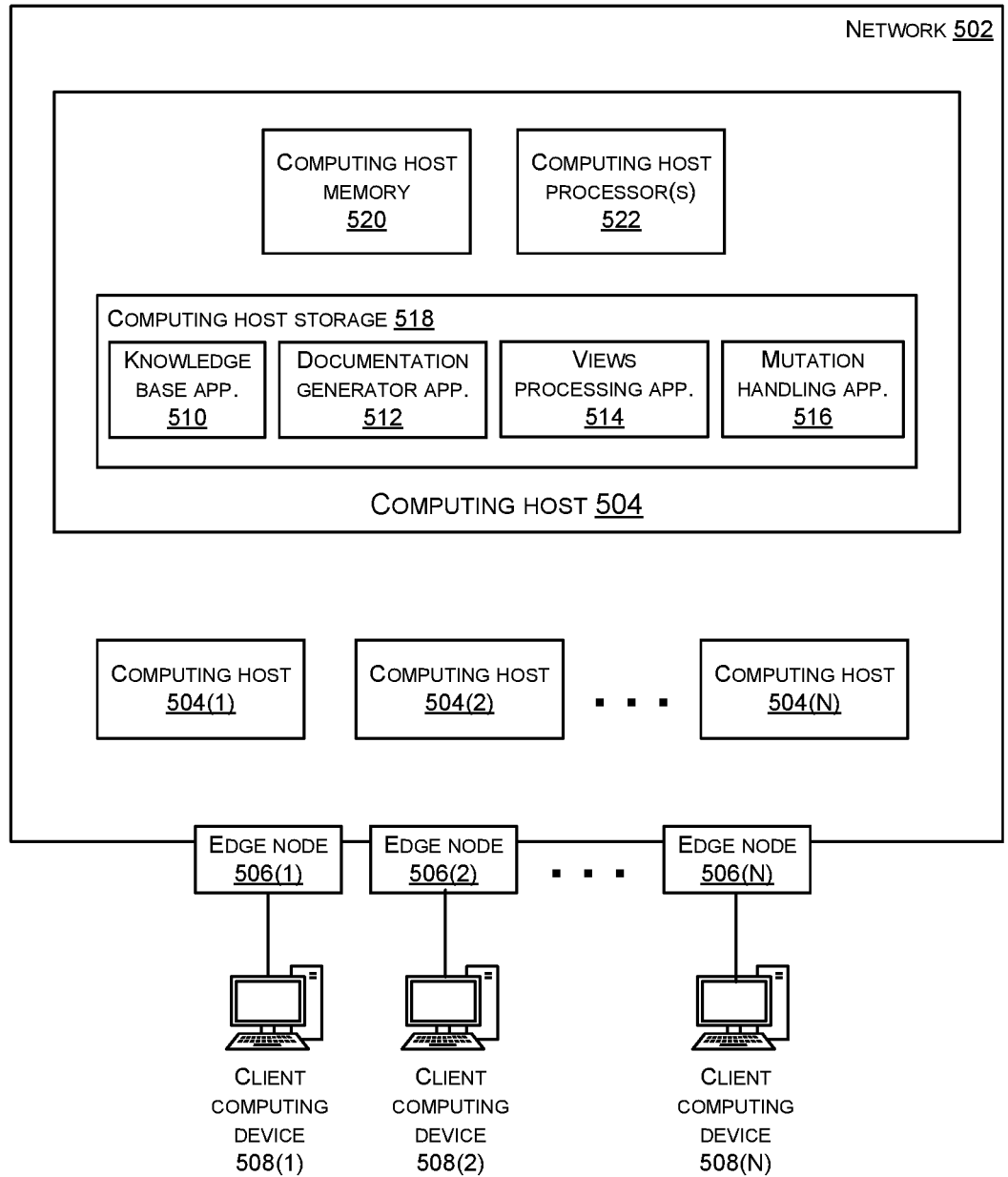
FIG. 5 illustrates an architectural diagram of a network architecture for computing resources and storage according to example embodiments of the present disclosure.

FIG. 5 illustrates an architectural diagram of a network architecture 500 for computing resources and storage according to example embodiments of the present disclosure. As described above, according to example embodiments of the present disclosure, a networked computing host may be operative as any or all of a knowledge base host, a generator host, a views processing host, and a mutation handler host as described above. Thus, this figure illustrates some possible architectural embodiments of computing systems as described above.

The network architecture 500 may be implemented over a network 502 of computing hosts 504(1), 504(2), . . . , 504(N) (where any unspecified computing host may be referred to as a computing host 504) connected by network connections. Furthermore, the network 502 terminates at edge nodes 506(1), 506(2), . . . , 506(N) (where any unspecified edge node may be referred to as an edge node 506) located at physical and/or logical edges of the network 502. The edge nodes 506(1) to 506(N) may connect to any number of client computing devices 508(1), 508(2), . . . , 508(N) (where any unspecified client device may be referred to as a client computing device 508).

A knowledge base application 510, a documentation generator application 512, a views processing application 514, and a mutation handler application 516 implemented on a computing host accessed through an interface of the network 502 as described in example embodiments of the present disclosure may be stored on storage of a computing host 504 ("computing host storage 518"), and may be loaded into physical or virtual memory of the computing host 504 ("computing host memory 520") in order for one or more physical or virtual processor(s) of the computing host 504 ("computing host processor(s) 522") to perform computations configured by the various applications as described herein.

According to example embodiments of the present disclosure, different modules of hosted applications as described below with reference to FIG. 6 may be executed by different processors of the computing host processor(s) 522 or may execute by a same processor of the computing host processor(s) 522 on different cores or different threads, and each module may perform computation concurrently relative to each other submodule (including concurrent operations as described above).

It should be understood that according to some example embodiments of the present disclosure, the knowledge base application need not be part of the network architecture 500, and may be hosted on one or more different networks not under common control as the network architecture 500. The documentation generator application 512, the views processing application 514, and the mutation handler application 516 may therefore configure computing hosts 504 to communicate with knowledge base hosts remotely over a network 502.

As described above, client computing devices 508 may connect to the networked computing hosts and send a request to the knowledge base application to perform a query operation, an update operation, and the like. In the event that the knowledge base application is hosted elsewhere, the client computing devices 508 may connect to the knowledge base application over other networks (not illustrated) instead.

Figure 6:
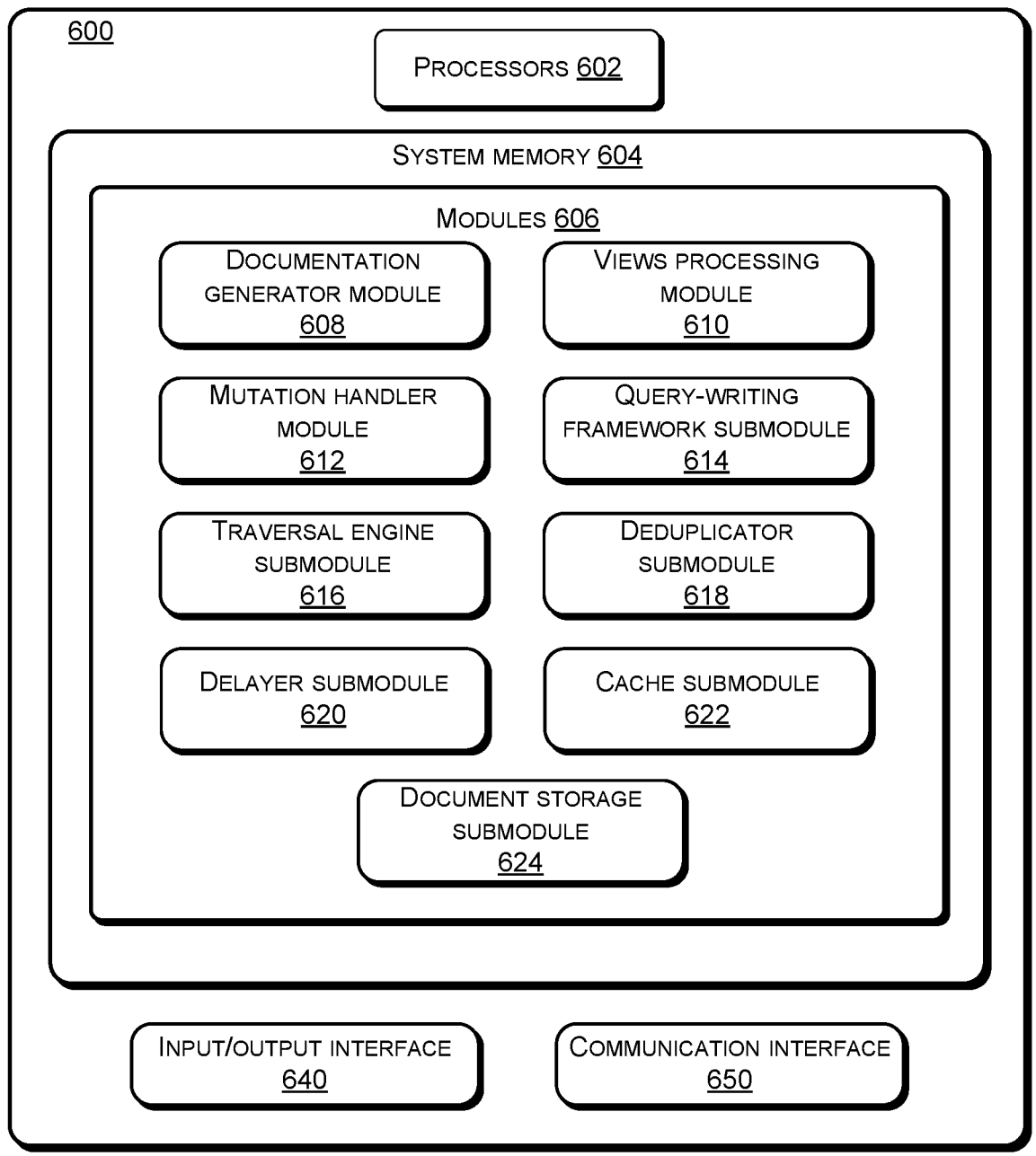
FIG. 6 illustrates an example computing system for implementing the processes and methods described herein for implementing a documentation generation engine coupled to a mutation handler configured to traverse a knowledge base to derive selective views.

FIG. 6 illustrates an example computing system 600 for implementing the processes and methods described above for implementing a documentation generation engine coupled to a mutation handler configured to traverse a knowledge base to derive selective views.

The techniques and mechanisms described herein may be implemented by multiple instances of the computing system 600, as well as by any other computing device, system, and/or environment. The computing system 600, as described above, may be any varieties of computing devices, such as personal computers, personal tablets, mobile devices, other such computing devices. The computing system 600 shown in FIG. 6 is only one example of a system and is not intended to suggest any limitation as to the scope of use or functionality of any computing device utilized to perform the processes and/or procedures described above. Other computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing system 600 may include one or more processors 602 and system memory 604 communicatively coupled to the processors 602. The processors 602 may execute one or more modules and/or processes to cause the processors 602 to perform a variety of functions. In embodiments, the processor(s) 602 may include a central processing unit ("CPU"), a graphics processing unit ("GPU"), any combinations thereof, or other processing units or components known in the art. Additionally, each of the processors 602 may possess its own local memory, which also may store program modules, program data, and/or one or more operating systems.

Depending on the exact configuration and type of the computing system 600, the system memory 604 may be volatile, such as RAM, non-volatile, such as ROM, flash memory, miniature hard drive, memory card, and the like, or some combination thereof. The system memory 604 may include one or more computer-executable modules 506 that are executable by the processors 602. The modules 606 may be hosted on a network as services for a data processing platform, which may be implemented on a separate system from the computing system 600.

The modules 606 may include, but are not limited to, a documentation generator module 608, a views processing module 610, and a mutation handler module 612. Any, some, or all of these modules may further include a query-writing framework submodule 614, a traversal engine submodule 616, a deduplicator submodule 618, a delayer submodule 620, a cache submodule 622, and a document storage submodule 624.

The documentation generator module 608 may configure one or more of the processors 602 to perform the functions of a generator host as described above.

The views processing module 610 may configure one or more of the processors 602 to perform the functions of a views processing host as described above.

The mutation handler module 612 may configure one or more of the processors 602 to perform the functions of a mutation handler host as described above.

The query-writing framework submodule 614 may configure one or more of the processors 602 to perform the functions of a query-writing framework as described above.

The traversal engine submodule 616 may configure one or more of the processors 602 to perform the functions of a traversal engine as described above.

The deduplicator submodule 618 may configure one or more of the processors 602 to perform the functions of a deduplicator as described above.

The delayer submodule 620 may configure one or more of the processors 02 to perform the functions of a delayer as described above.

The cache submodule 622 may configure one or more of the processors 602 to perform the functions of a cache as described above.

The document storage submodule 624 may configure one or more of the processors 602 to perform the functions of a document storage as described above.

The computing system 600 may additionally include an input/output ("I/O") interface 640 and a communication module 650 allowing the system 600 to communicate with other systems and devices over a network, such as server host(s) as described above. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides a documentation generation engine coupled to a mutation handler configured to traverse a knowledge base to derive selective views. Organizations may configure a documentation generator application running on generator hosts to summarize records of a knowledge base storing institutional knowledge, and relationships therebetween, as a series of human-readable reference documents. However, it is undesired for the documentation generator to, whenever a change occurs at one or more records of the knowledge base, query the knowledge base on a naive basis in order to derive views required to generate updated documentation. Therefore, example embodiments of the present disclosure provide a query-writing framework which describes a schema organizing these records for human readability and describing relationships of these records to other records of interest, from which a set of queries may be derived which cause a knowledge base to return all records topically related by a schema of a query-writing framework, while minimizing excess querying which may unnecessarily amplify computational workload and network traffic.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    applying an event message based on a mutation operation at a knowledge base host to a query-writing framework, and parsing, by the query-writing framework, a topical schema applied to a starting node of the event message to output a first selective query;
    querying the knowledge base host using the first selective query to traverse from the starting node, traversal being constrained by at least a node type list and an edge type list of the topical schema; and
    publishing a root node event message comprising a root node returned from the first selective query.

2. The method of claim 1, wherein the first selective query causes a selective upward traversal of a graph database hosted on the knowledge base host.

3. The method of claim 1, further comprising retaining an earliest copy of the root node event message for the duration of a message retention window.

4. The method of claim 3, further comprising adding a delay period to a publishing time of the root node event message, the delay period comprising the message retention window, a cache retention window, and a maximum clock skew of the knowledge base host.

5. The method of claim 1, further comprising applying the root node event message to the query-writing framework to output a second selective query.

6. The method of claim 5, further comprising querying a local cache using the second selective query; and
    querying the knowledge base host using the second selective query after querying the local cache.

7. The method of claim 6, further comprising updating one or more documents of a document storage based on records returned from the second selective query.

8. A computing system comprising:
    one or more processors; and
    memory communicatively coupled to the one or more processors, the memory storing computer-executable modules executable by the one or more processors that, when executed by the one or more processors, perform associated operations, the computer-executable modules comprising:
        a mutation handler module executable by the one or more processors to apply an event message based on a mutation operation at a knowledge base host to a query-writing framework submodule, the query-writing framework submodule being executable by the one or more processors to parse a topical schema applied to a starting node of the event message and output a first selective query; query the knowledge base host using the first selective query to traverse from the starting node, traversal being constrained by at least a node type list and an edge type list of the topical schema; and publish a root node event message comprising a root node returned from the first selective query.

9. The system of claim 8, further comprising a traversal engine submodule executable by the one or more processors to perform the first selective query by a selective upward traversal of a graph database hosted on the knowledge base host.

10. The system of claim 8, further comprising a deduplicator submodule executable by the one or more processors to retain an earliest copy of the root node event message for the duration of a message retention window.

11. The system of claim 10, further comprising a delayer submodule executable by the one or more processors to add a delay period to a publishing time of the root node event message, the delay period comprising the message retention window, a cache retention window, and a maximum clock skew of the knowledge base host.

12. The system of claim 8, further comprising a documentation generator module executable by the one or more processors to apply the root node event message to the query-writing framework to output a second selective query.

13. The system of claim 12, wherein the documentation generator module is further executable by the one or more processors to query a local cache using the second selective query, and to query the knowledge base host using the second selective query after querying the local cache.

14. The system of claim 13, wherein the documentation generator module is further executable by the one or more processors to update one or more documents of a document storage based on records returned from the second selective query.

15. A computer-readable storage medium storing computer-readable instructions executable by one or more processors, that when executed by the one or more processors, cause the one or more processors to perform operations comprising:

applying an event message based on a mutation operation at a knowledge base host to a query-writing framework and parsing, by the query-writing framework, a topical schema applied to a starting node of the event message to output a first selective query;

querying the knowledge base host using the first selective query to traverse from the starting node, traversal being constrained by at least a node type list and an edge type list of the topical schema; and publishing a root node event message comprising a root node returned from the first selective query.

16. The computer-readable storage medium of claim 15, wherein the operations further comprise retaining an earliest copy of the root node event message for the duration of a message retention window.

17. The computer-readable storage medium of claim 16, wherein the operations further comprise adding a delay period to a publishing time of the root node event message, the delay period comprising the message retention window, a cache retention window, and a maximum clock skew of the knowledge base host.

18. The computer-readable storage medium of claim 15, wherein the operations further comprise applying the root node event message to the query-writing framework to output a second selective query.

19. The computer-readable storage medium of claim 18, wherein the operations further comprise querying a local cache using the second selective query and querying the knowledge base host using the second selective query after querying the local cache.

20. The computer-readable storage medium of claim 19, wherein the operations further comprise updating one or more documents of a document storage based on records returned from the second selective query.

* * * * *